United States Patent
Zhang

(10) Patent No.: US 10,364,600 B2
(45) Date of Patent: Jul. 30, 2019

(54) BELT TENSIONING DEVICE FOR A HOLLOW BLIND

(71) Applicants: Xuezhong Zhang, Shanghai (CN); INTIGRAL, INC., Walton Hills, OH (US)

(72) Inventor: Xuezhong Zhang, Shanghai (CN)

(73) Assignee: INTIGRAL, INC., Walton Hills, OH (US)

(*) Notice: Subject to any disclaimer, the term of this patent is extended or adjusted under 35 U.S.C. 154(b) by 0 days.

(21) Appl. No.: 15/328,298

(22) PCT Filed: Jul. 24, 2015

(86) PCT No.: PCT/US2015/042039
§ 371 (c)(1),
(2) Date: Jan. 23, 2017

(87) PCT Pub. No.: WO2016/014965
PCT Pub. Date: Jan. 18, 2016

(65) Prior Publication Data
US 2017/0211317 A1      Jul. 27, 2017

(30) Foreign Application Priority Data
Jul. 24, 2014 (CN) .................... 2014 2 0409810 U

(51) Int. Cl.
*E06B 9/32* (2006.01)
*E06B 9/322* (2006.01)
(Continued)

(52) U.S. Cl.
CPC .............. *E06B 9/322* (2013.01); *E06B 9/262* (2013.01); *E06B 9/264* (2013.01); *E06B 9/32* (2013.01);
(Continued)

(58) Field of Classification Search
CPC .. E06B 9/322; E06B 9/264; E06B 2009/2643; E06B 2009/785; F16H 7/1263;
(Continued)

(56) References Cited

U.S. PATENT DOCUMENTS

RE1,144 E * 2/1861 Burchell .................... 474/136
43,503 A * 7/1864 Hubert ...................... 474/136
(Continued)

FOREIGN PATENT DOCUMENTS

CA    2879353 A1    1/2014
CN    203066820 U   7/2013
(Continued)

OTHER PUBLICATIONS

Patent Cooperation Treaty (PCT), International Search Report and Written Opinion for Application PCT/US2015/042039 filed Jul. 24, 2015, dated Oct. 13, 2015, International Searching Authority, EP.

*Primary Examiner* — Katherine W Mitchell
*Assistant Examiner* — Abe Massad
(74) *Attorney, Agent, or Firm* — McDonald Hopkins LLC

(57) ABSTRACT

In one embodiment, the present invention relates to a belt tensioning device for a hollow blind that comprises: a holder seat equipped with a lower belt gear on the top portion of the holder, the holder seat is in clearance fit with a lumen of a side frame of the hollow blind and is provided with a group of V-shaped slots from top to bottom therein, each V-shaped slot is equipped with a clip therein, the slip has a width slightly larger than the width of the lumen of the side frame of the hollow blind when being bent. The present invention allows the belt tensioning device to move along a single direction within the side frame of the hollow blind so that the distance between two belt gears can be gradually adjusted, thereby maintaining a proper tensioning force in the belt.

3 Claims, 2 Drawing Sheets

(51) Int. Cl.
*E06B 9/262* (2006.01)
*E06B 9/264* (2006.01)
*F16H 7/12* (2006.01)
*F16H 7/08* (2006.01)

(52) U.S. Cl.
CPC .... *F16H 7/1263* (2013.01); *E06B 2009/2643* (2013.01); *F16H 2007/0842* (2013.01); *F16H 2007/0865* (2013.01); *F16H 2007/0891* (2013.01)

(58) Field of Classification Search
CPC ........... F16H 7/1272; F16H 7/0848; F16H 2007/0842; F16H 2007/0865; F16H 2007/0891; F16H 2007/0851; F16H 2007/0895; A47H 3/08; A47H 3/12
USPC .................................................. 474/138, 136
See application file for complete search history.

(56) References Cited

U.S. PATENT DOCUMENTS

| | | | | |
|---|---|---|---|---|
| 114,494 A | * | 5/1871 | Turner | 474/136 |
| 134,812 A | * | 1/1873 | Ludlow | 24/115 R |
| 135,950 A | * | 2/1873 | Traphagen | 474/136 |
| 137,450 A | * | 4/1873 | Judd | 474/136 |
| 147,493 A | * | 2/1874 | Fry | 24/115 R |
| 161,407 A | * | 3/1875 | Hall | F16G 11/00 24/115 R |
| 3,894,441 A | * | 7/1975 | Falkenberg | A47H 3/08 267/72 |
| 4,662,862 A | * | 5/1987 | Matson | F16H 7/08 474/101 |
| 4,798,562 A | * | 1/1989 | Matson | F16H 7/08 474/101 |
| 4,969,859 A | * | 11/1990 | Holbrook | F16H 7/1263 474/138 |
| 6,083,132 A | * | 7/2000 | Walker | F16H 7/0848 474/101 |
| 7,451,956 B2 | * | 11/2008 | Bohlen | E06B 9/323 248/220.21 |
| 2013/0233500 A1 | | 9/2013 | Chen | |

FOREIGN PATENT DOCUMENTS

| | | |
|---|---|---|
| CN | 203066821 U | 7/2013 |
| EP | 2216485 A2 | 8/2010 |
| WO | 2012/092549 A1 | 7/2012 |

* cited by examiner

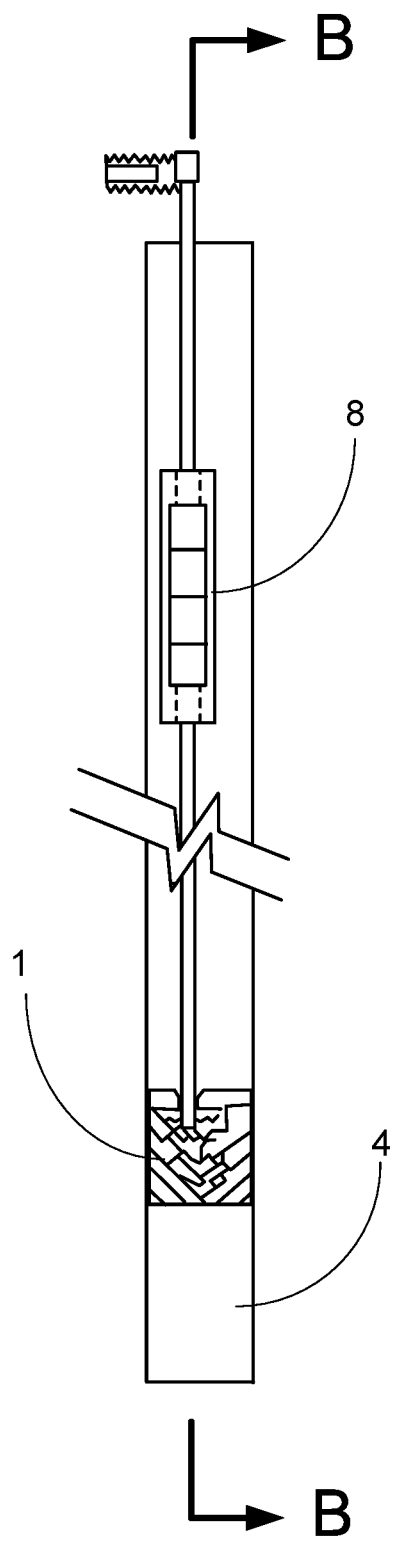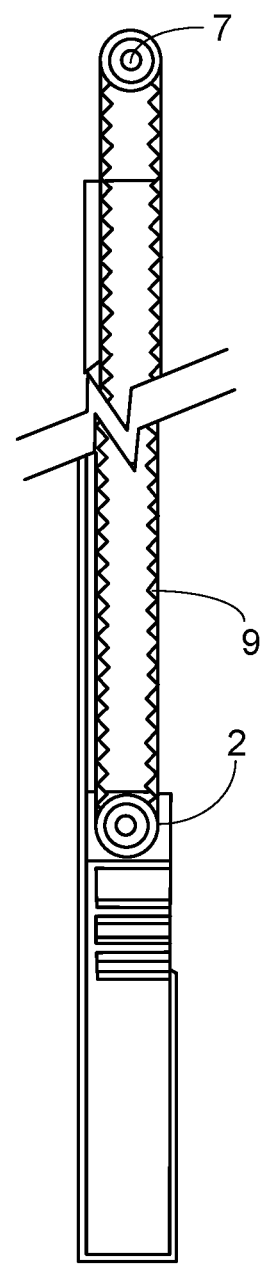
FIG. 1
FIG. 2

BELT TENSIONING DEVICE FOR A HOLLOW BLIND

RELATED APPLICATION DATA

This application claims priority to and is a national phase filing under 35 U.S.C. § 371 of PCT/US2015/042039 filed Jul. 24, 2015 and entitled "Belt Tensioning Device for a Hollow Blind," which itself claims priority benefit to Chinese National Patent Application No. 201420409810.8 filed Jul. 24, 2014.

FIELD OF THE INVENTION

The present invention relates to a hollow blind, and more particularly to a belt tensioning device for a hollow blind.

BACKGROUND OF THE INVENTION

There is a growing international popularity for hollow blinds, due to their good thermal insulation, light transmittance and sun-shading properties. A so-called hollow blind mainly consists of a set of sun-shading sheets and a belt driven system which are sealed in hollow glasses. The driven system mainly includes both an upper belt gear and a lower belt gear. A belt is connected end to end by a drive handle and surrounds the two belt gears, wherein the upper belt gear is connected to a rope roller for the sun-shading sheets to control the sun-shading sheets to move up or down; and the belt must be in a tension state, so that the driving handle and the upper belt gear can make synchronized motions. This is usually achieved through precise adjustment of the length of the belt or precise adjustment of the distance between the upper and lower belt gears, which is a difficult problem for the hollow blind for the following reasons: a side frame is of a kind of profile with a rectangular cross-section, and a belt tensioning device along with the belt driven system are disposed in the interior of the profile, thus it is very difficult to adjust the tension of the belt. If the tension is too small, the belt will be easy to skip teeth, causing failure; and if the tension is too large, the resulting friction will be too large, making it difficult to move the blind up or down.

SUMMARY OF THE INVENTION

The present invention is designed to overcome the deficiencies of the prior art and to provide a belt tensioning device for a hollow blind. The present invention allows the belt tensioning device to move along only a single direction within the side frame of the hollow blind, so that the distance between two belt gears can be gradually adjusted, thereby maintaining a proper tensioning force in the belt.

To solve the above problem, there is provided a belt tensioning device for a hollow blind, comprising a holder seat equipped with a lower belt gear on the top portion of the holder, the holder seat is in clearance fit with a lumen of a side frame of the hollow blind and is provided with a group of V-shaped slots from top to bottom therein, each V-shaped slot is equipped with a clip therein, the slip has a width slightly larger than the width of the lumen of the side frame of the hollow blind when being bent.

In the belt tensioning device for a hollow blind, a vertical pressing block is disposed on the central portion of each V-shaped slot.

In the belt tensioning device for a hollow blind, a notch is formed at the center of one side of the clip.

According to the present invention, the clip is additionally provided in the holder seat, the clip is recessed downward at its central portions to form V-shape by using the slot, and meanwhile, the clip has a width slightly larger than the width of the cavity in the side frame when being recessed downward, so that the clip is held against two walls of the cavity in the window frame, thus preventing the belt tensioning device from sliding upward easily. On the contrary, because the clip is recessed downward, two ends of the clip are bent to its center when the fixing device moves downward, so that the friction generated between the clip and the inner walls of the side frame is very small, thus allowing the fixing device to move downward smoothly.

When the belt tensioning device moves downward to a proper position, the belt can be maintained in a tension state. At that time, the two ends of the clip press tightly against the two walls of the lumen of the side frame, so that the clip is stuck on the inner walls of the side frame of the hollow blind, preventing the belt tensioning device from moving upward and ensuring the belt being in a tension state.

BRIEF DESCRIPTION OF THE DRAWINGS

The present invention is further explained in conjunction with the accompanying drawings:

FIG. 1 is a schematic view of a device according to the present invention;

FIG. 2 is a side view of FIG. 1;

DETAILED DESCRIPTION

Figure 3:
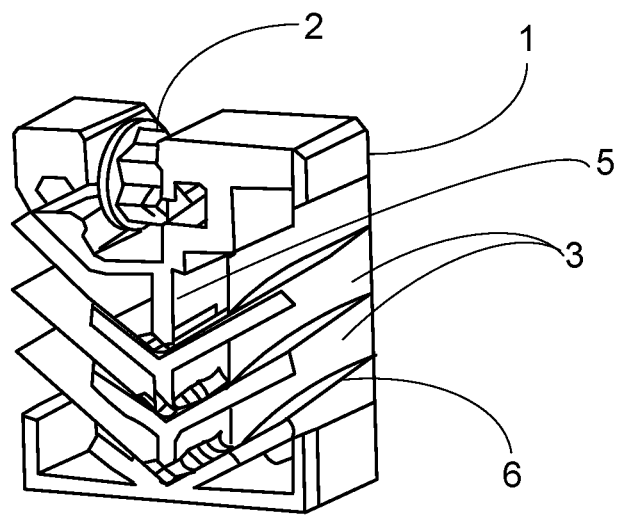
FIG. 3 is a schematic view of the preferred embodiment according to the present invention.

The present invention relates to a hollow blind with a belt tensioning device for the hollow blind. A belt tensioning device for a hollow blind comprises: a holder seat equipped with a lower belt gear on the top portion of the holder, the holder seat is in clearance fit with a lumen of a side frame of the hollow blind and is provided with a group of V-shaped slots from top to bottom therein, each V-shaped slot is equipped with a clip therein, the slip has a width slightly larger than the width of the lumen of the side frame of the hollow blind when being bent. The present invention allows the belt tensioning device to move along a single direction within the side frame of the hollow blind, so that the distance between two belt gears can be gradually adjusted, thereby maintaining a proper tensioning force in the belt.

As shown in FIG. 1 and FIG. 2, 7 is an upper belt gear, 8 is a handle, and 9 is a belt. The present invention is a belt tensioning device for sun-shading sheets of a hollow blind, which includes a holder seat 1. The holder seat is equipped with a lower belt gear 2 on its top portion. The holder seat 1 is in clearance fit with a lumen of a side frame 4 of the hollow blind and is provided with a group of V-shaped slots 3 from top to bottom therein. Each V-shaped slot is equipped with a clip 6 therein. When being bent downward at its central portion, the slip has a width slightly larger than the width of the lumen of the side frame of the hollow blind, so that the clip is stuck on the inner walls of the side frame, thus preventing it from moving upward and ensuring the belt being in a tension state.

Referring to FIG. 3, in a preferred embodiment of the present invention, there are provided with three V-shaped slots 3. A vertical pressing block 5 is disposed on the central portion of each clip and presses the central portion of the clip 6, so that the clip 6 is recessed downward to form a V-shape and make sure it will not return to the flat and straight state due to elastic force.

Figure 4:
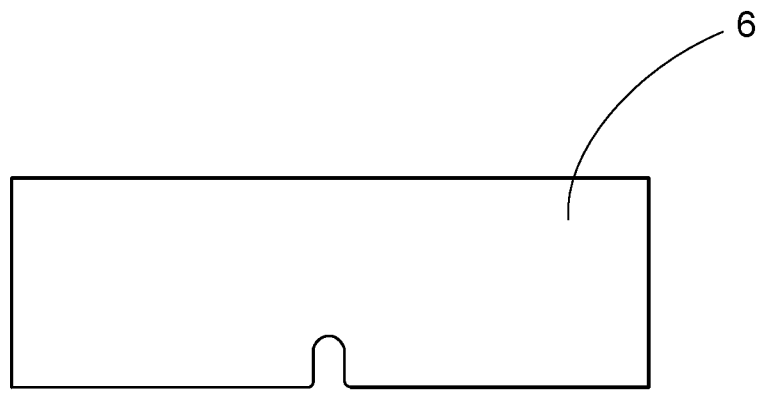
FIG. 4 is a schematic view of a clip.

In the fixing device for the sun-shading sheets of the hollow blind, a notch is formed at the center of one side of the clip 6 (see FIG. 4).

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A belt tensioning device for a hollow blind comprising:
 a holder seat equipped with a lower belt gear on the top portion of the holder,
 wherein the holder seat is in clearance fit with a lumen of a side frame of the hollow blind and is provided with a group of V-shaped slots from top to bottom therein and a plurality of clips, wherein each V-shaped slot is formed from two intersecting sloped sides that meet a vertex and wherein each V-shaped slot is equipped with one of the plurality of clips therein, the plurality of clips each having a width slightly larger than the width of the lumen of the side frame of the hollow blind when bent, and wherein opposite ends of each of the plurality of clips interact with the lumen of the side frame of the hollow blind, such that the holder seat is movable in a first direction along a longitudinal axis of the lumen, and the holder seat is prevented from moving in an opposite second direction along the longitudinal axis.

2. The belt tensioning device for a hollow blind according to claim 1, wherein a vertical pressing block is disposed on a central portion of each V-shaped slot.

3. The belt tensioning device for a hollow blind according to claim 1, wherein a notch is formed at a center of one side of the clip.

* * * * *